March 14, 1944.  J. SHEPTINSKY  2,344,003
DEVICE FOR PRODUCING INCISIONS IN RODS OR TUBES
Filed March 9, 1943 2 Sheets-Sheet 2
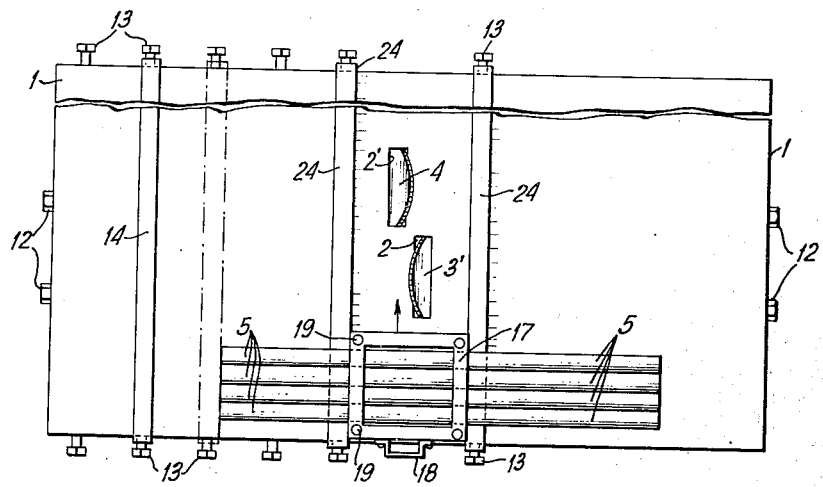
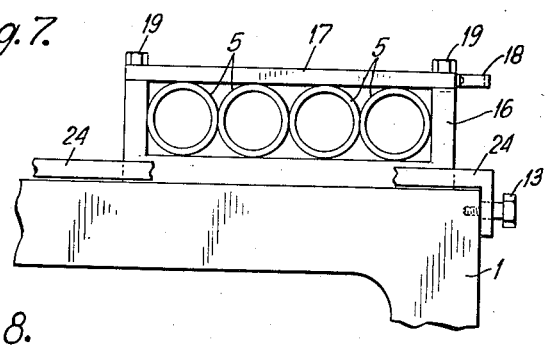
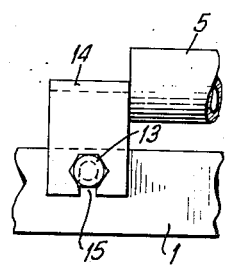
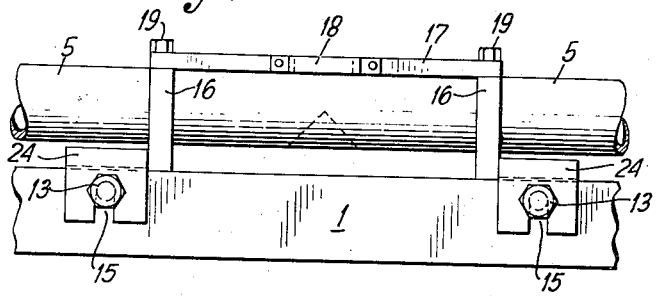
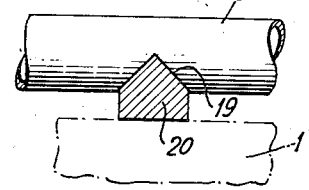
INVENTOR.
JULIUS SHEPTINSKY
BY Patented Mar. 14, 1944

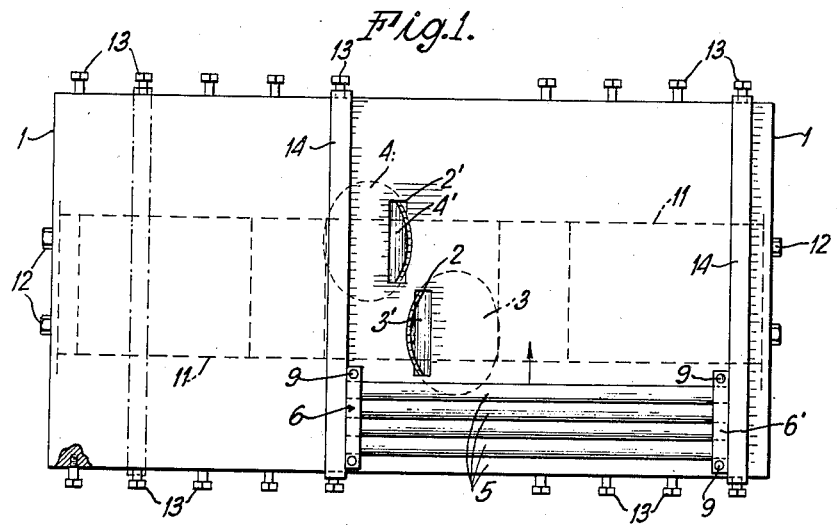
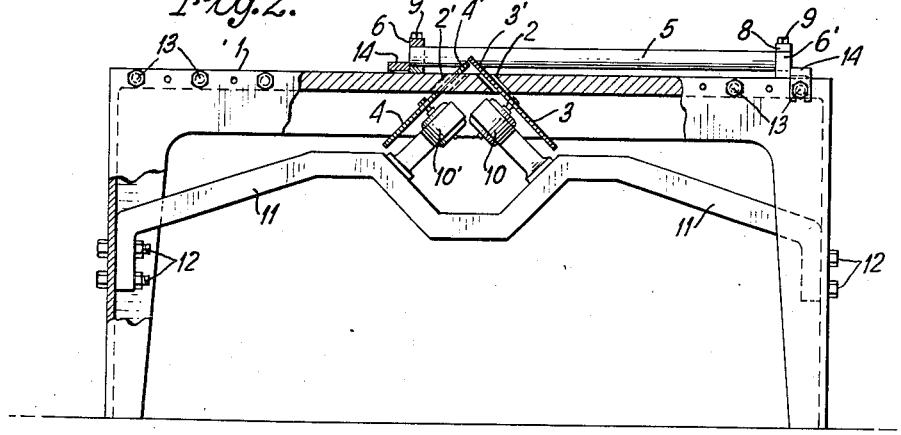
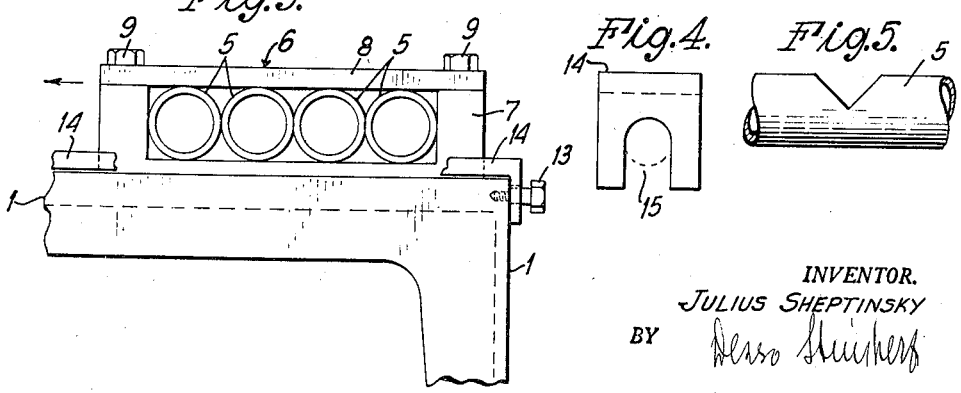

2,344,003

UNITED STATES PATENT OFFICE 2,344,003

DEVICE FOR PRODUCING INCISIONS IN RODS OR TUBES

Julius Sheptinsky, Brooklyn, N. Y., assignor to Bruno Patents Inc., Long Island City, N. Y.

Application March 9, 1943, Serial No. 478,573

3 Claims. (Cl. 29—70)

This invention relates to the production of V-shaped incisions in rod-like or tubular bodies, situated transversely of the longitudinal axis of said bodies, and more particularly to a device for producing such incisions, the sides of which lie in planes, each of which forms a predetermined angle with the axis of the rod-like or tubular body.

It is one object of this invention to provide a device adapted to produce V-shaped incisions of the above mentioned type in one operation.

Another object of this invention is to produce such V-shaped incisions corresponding to a predetermined design and situated in predetermined positions.

A further object of my invention is to produce V-shaped incisions of the above mentioned type in two or more rod-like or tubular bodies simultaneously.

It is also an object of my invention to provide in the cutting device adjustable guide means for the bodies in which the V-shaped incisions are made.

A further object is to provide a device of the above mentioned character, which will be simple in construction and operation and inexpensive.

Other objects will be apparent from the following specification, the appended claims and the drawings which show by way of example a preferred embodiment of my invention, and in which Fig. 1 is a plan view of the device according to my invention, showing the tubes in their initial position prior to cutting;

Fig. 2 is an elevation partly in section of the device illustrated in Fig. 1, and shows the tubes after the first cutting operation;

Fig. 3 is an enlarged end view of a portion of the machine;

Fig. 4 illustrates a detail of the stop bar used in the device shown in Figs. 1 and 2;

Fig. 5 illustrates a tube provided with a V-shaped cut of the type produced according to my present invention;

Fig. 6 is the plan view of a preferred embodiment of my invention showing four tubes in the position prior to cutting;

Fig. 7 is an enlarged end view of a portion of the machine;

Fig. 8 is an enlarged end view of another portion of the machine;

Fig. 9 shows a means for aligning the tubes before clamping them together prior to making the cuts;

Fig. 10 illustrates a tube provided with a plurality of V-shaped cuts of the type produced according to my invention, and Fig. 11 is an end view of the stop bar shown in Fig. 6.

Referring now to Figures 1 and 2, I denotes a rectangle-shaped table provided with two slots 2 and 2'. These slots are arranged parallel to each other and parallel to the shorter edges of table I and they are spaced from each other in longitudinal direction and also in the direction forming a right angle thereto. Portion 3' of a circular saw-blade 3 and portion 4' of a second circular saw-blade 4 protrude through slots 2 and 2', respectively, and serve for producing the V-shaped incisions in tubes 5, arranged on table I upon moving the tubes toward said projecting portions of the saw-blades. In the embodiment shown, four tubes are held in a fixed position relative to each other by means of clamping means 6 and 6'. Each of these clamping means may consist of a base part 7 and an upper part 8, which is adapted to be fastened to part 7 by means of screws 9 and to hold tubes 5 in a fixed position relative to each other. The position and movement of tubes 5 during cutting is determined by an adjustable stop bar 14 which serves to hold the tubes in the desired longitudinal position, in which the axes of the tubes are parallel to the front edge of the table. Bar 14 also serves to guide tubes 5 while the latter are moved across the table toward the saw-blades and keep them parallel to their original position during cutting. A second stop and guide bar 14' may be provided, if desired, at the other end of tubes 5. The end portions of bars 14 and 14' are provided with cut-outs 15 fitting to settable pins 13 screwed in holes in the longitudinal edge of table I in predetermined distances. This edge may be provided with a suitable number of holes for receiving the pins 13, and the desired distance between the pins may be adjusted by transferring the pins into holes of suitable distance.

The circular saw-blades 3 and 4 are mounted on electromotors 10 and 10', respectively, and these electromotors may be mounted on a base or support 11 fastened to table I as shown in Fig. 2.

In order to produce the incisions in tubes 5, these tubes are first fixed in clamping means 6 and 6' and fastened therein by means of bar 8 and fastening elements 9. The tubes are then caused to move across the table toward the saw-blades which then cut the right and left sides of the incisions in tubes 5 subsequently. During such movement stop bar 14 and, if desired, also stop bar 14', serve for guiding the tubes in the proper direction.

After making one complete V-shaped incision in each of the tubes, the stop bar is removed from its original position and set in a new position, as indicated in chain lines in Fig. 1, and then a second incision may be produced in the tubes substantially in the above described manner.

The device shown in Figs. 1 and 2 is adapted to produce V-shaped incisions, the sides of which lie in planes forming a right angle, and the depth of which amounts to one half of the diameter of the tube. But incisions of other depth and V-shaped incisions, the sides of which form an acute or obtuse angle, may also be cut by a suitable arrangement of the circular saw-blades.

In the preferred embodiment shown in Fig. 6, the arrangement of the saw-blades and tubes is substantially similar to the arrangement shown in Fig. 1. The clamping means shown in this embodiment consists of two parallel U-shaped elements 16, which are held in position by a rectangle-shaped element 17, fastened to elements 16 by means of screws 19. This clamping means is provided with a handle 18, and is guided by bars 24, 24 while moving said clamping means and the tubes across the table toward the saw-blades. After producing a V-shaped cut, the tubes are first moved back to their initial position. They are then moved to the left in longitudinal direction until they reach stop bar 14 placed in the position shown in full lines in Fig. 6, and are then peripherally aligned by placing in the cuts previously produced an aligning means 20, having an upper profile registering with the cuts 19 as shown in Fig. 9. The longitudinally and peripherally aligned tubes are then clamped in clamping means 16, 17, and a new cut may then be produced in the above described manner.

Fig. 10 illustrates a tube provided with several V-shaped cuts in the above described manner.

It will be understood that the present invention is not restricted to the preferred embodiment and the details described above and shown in the drawings, and may be carried out in other specific ways than those herein set forth. For example, instead of one pair of circular saw-blades two or more pairs may be used, and instead of 4 tubes more or less tubes may be held and provided with incisions simultaneously. Furthermore, a machine frame, and/or base or support of other design for the saw-blades and stops and guide means of other construction or design may be used. The embodiments and details shown should be, therefore, considered as illustrative and not restrictive within the spirit of the invention as defined in the appended claims.

I claim:

1. A device for the simultaneous production of V-shaped incisions of substantially identical design and dimensions in several straight, cylindrical bodies of substantially identical diameters, transversely of the longitudinal axis of said bodies, the sides of said incisions lying in planes, each of which forms the same predetermined angle with the axis of the bodies, said device comprising means for holding said bodies in a fixed parallel position relative to each other, a table having a plane upper surface and provided with adjustable means for guiding said bodies in a direction forming a right angle with the axis of the bodies, a first circular saw-blade for cutting one side of the incisions, said first saw-blade being connected with an electromotor mounted on a stationary base arranged below the table area, partially extending through a slot arranged in said direction in the surface of the table, while forming said predetermined angle with said surface, a second circular saw-blade for cutting the other side of the incisions, said second saw-blade partially extending through a second slot in the surface of the table, being connected with an electromotor mounted on said stationary base, and arranged symmetrically with respect to said first saw-blade, said bodies being capable of relative movement in said direction with respect to said first and second saw-blade, which are spaced in the direction of said movement for carrying out said cutting of the sides subsequently during said movement.

2. A device for the simultaneous production of a series of V-shaped incisions of substantially identical design, location, and dimensions in several straight, cylindrical bodies of substantially identical diameters, transversely of the longitudinal axis of said bodies and for the successive production of several longitudinally spaced series of said incisions in predetermined distances, the sides of said incisions lying in planes, each of which forms the same predetermined angle with the axis of the bodies, said device comprising an adjustable stop bar and clamping means for holding said bodies in a fixed, parallel, axially and peripherally aligned position relative to each other, a table having a plane upper surface and provided with two guide bars for guiding said clamping means in a direction forming a right angle with the axis of the bodies, a first circular saw-blade for cutting one side of the incisions, said first saw-blade being connected with an electromotor mounted on a stationary base arranged below the table area, partially extending through a slot arranged in said direction in the surface of the table, while forming said predetermined angle with said surface, a second circular saw-blade for cutting the other side of the incisions, said second saw-blade partially extending through a second slot in the surface of the table, being connected with an electromotor mounted on said stationary base, and arranged symmetrically with respect to said first saw-blade, said bodies being capable of relative movement in said direction with respect to said first and second saw-blade, which are spaced in the direction of said movement for carrying out said cutting of the sides subsequently during said movement.

3. A device for the simultaneous production of several series of V-shaped incisions of substantially equal design, location and dimensions in several straight cylindrical bodies of substantially identical diameters, transversely of the longitudinal axis of said bodies, and for the successive production of several longitudinally spaced series of said incisions in predetermined distances, the sides of said incisions lying in planes, each of which forms the same predetermined angle with the axis of said bodies, said device comprising an adjustable stop bar and clamping means for holding said bodies in a fixed parallel, axially and peripherally aligned position relative to each other, a table having a plane upper surface and provided with two guide bars for guiding said clamping means in a direction forming a right angle with the axis of the bodies, a first circular saw-blade for cutting one side of the incisions, said first saw-blade being connected with an electromotor mounted on a stationary base, which is arranged below and forms a part of the table, said saw-blade partially extending through a slot arranged in said direction in the top of the table, while forming said predetermined angle with the surface of the table, a second circular saw-blade for cutting the other side of the incisions, said second saw-blade partially extending through a second slot in the surface of the table, being connected with an electromotor mounted on said stationary base, and arranged symmetrically with respect to said first saw blade, said bodies being capable of relative movement in said direction with respect to said first and second saw-blade, which are spaced in the direction of said movement for carrying out said cutting of the sides subsequently during said movement.

JULIUS SHEPTINSKY.